July 5, 1932.  H. BREEN  1,865,671

WEEDING PICK

Filed Nov. 22, 1927

INVENTOR.
HENRY BREEN.
BY Harry C. Schroeder
ATTORNEY.

Patented July 5, 1932

1,865,671

UNITED STATES PATENT OFFICE

HENRY BREEN, OF OAKLAND, CALIFORNIA, ASSIGNOR OF ONE-HALF TO ALBERT ST. JOHN WILLIAMSON, OF BERKELEY, CALIFORNIA

WEEDING PICK

Application filed November 22, 1927. Serial No. 234,996.

The invention forming the subject matter of this application relates to gardening tools and particularly weeding picks.

The principal object of the invention is to provide a weeding pick, one end of which may be used for general gardening and picking or cutting of the large weeds in the garden or on the lawn and the other end thereof is adapted to be used as a weed puller to grasp and pull out of the ground the small weeds and the roots thereof, such as dandelions and the like.

Another object of the invention is to secure the weeding pick to a handle providing sufficient leverage to permit the weeding of the garden or the lawn without necessitating the stooping down of the gardener.

A further object of the invention is to provide a weeding pick of such a design as to provide a natural leverage for pulling out the weeds and the roots thereof from the ground, thereby obviating the exertion of any unnecessary effort, and permitting the weeding of a larger part of a garden or lawn in a given time than any gardening tool in use at present.

Another object of this invention is to provide a weeding pick which is highly useful and which combines light weight and comparative inexpense of manufacture with a ruggedness of construction and ease of operation especially adapting it for its use.

Being a unitary character the device requires no careful setting up and lends itself to effective application by the labor ordinarily available.

With the foregoing and other objects in view my invention resides in the combination and arrangement of parts, and in the details of construction hereinafter described and claimed, it being understood that changes in the precise embodiment of the invention hereinafter disclosed may be made within the scope of the appended claim without departing from the spirit of the invention.

The weeding tool is clearly illustrated in the accompanying drawing forming part of the specification, and in which.

Figure 1:
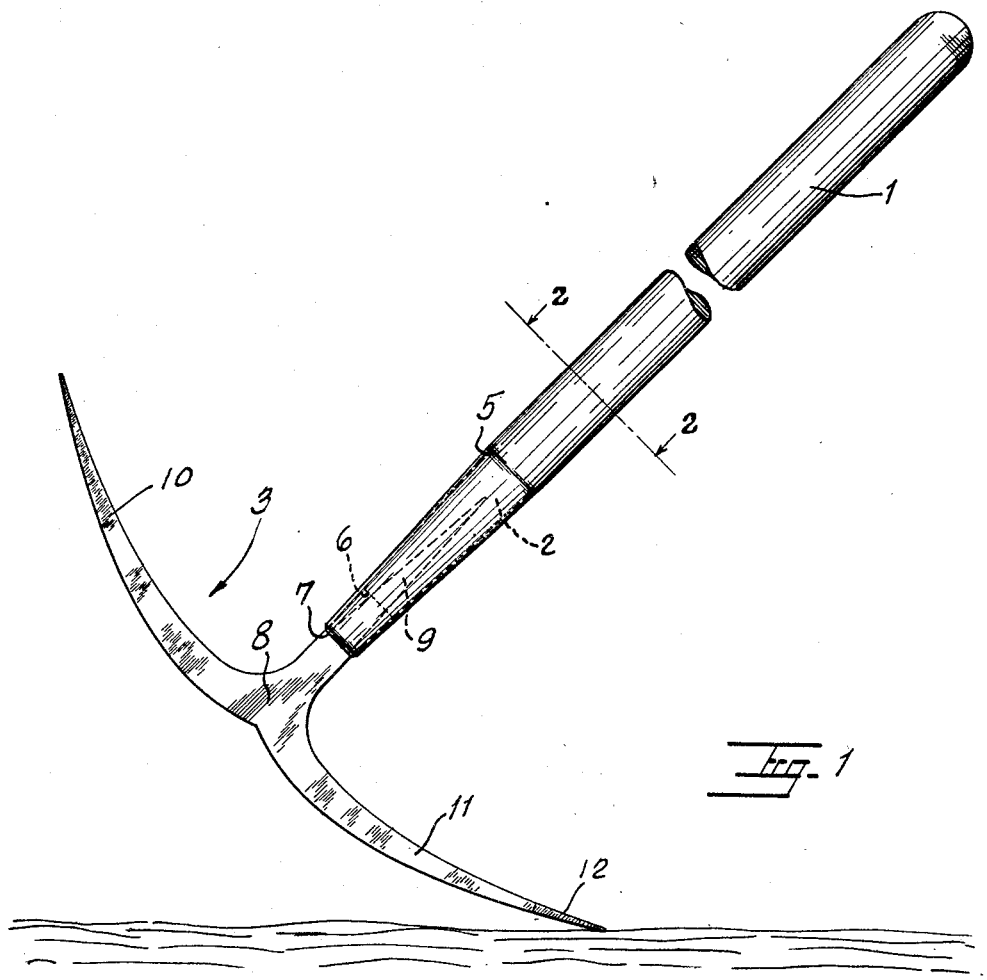
Figure 1 is a side elevation of the weeding pick.
Figure 2:
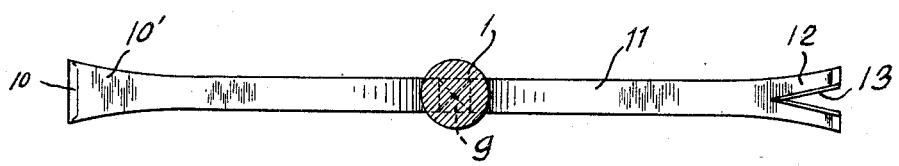
Figure 2 is a sectional plan view of the weeding pick, the section being taken on the line 2—2 of Figure 1.

In carrying out my invention, I provide a handle 1 having a tapered end 2 thereon, adapted to receive a weeding tool 3. The handle 1 may be made of different lengths to provide the right leverage for different operations and for the use of the same in different parts of the garden. A ferrule 4 is fitted over the tapered end 2 of the handle 1 so as to reinforce the same. A shoulder 5 is formed at the base of the tapered end 2 so that the wider end of the ferrule rests thereon. The ferrule 4 is preferably made longer than the tapered end 2 so as to provide a clearance between the end of the taper 6 and the end of the ferrule 7.

The weeding pick 3 consists of a hub portion 8 having a rectangular spike 9 extending therefrom. The rectangular spike 9 is tapered to a sharp edge or point and is adapted to be driven into a corresponding hole in the tapered end of the handle 1. The end of the hub 8 adjacent to the spike 9 is shouldered and rests upon the end of the ferrule 2. An arcuate cutting blade 10 extends at one side of the hub 8 the end thereof being flared as at 10′. Said flared end is adapted to be used for weeding or cutting the larger weeds. An arcuate weed puller blade 11 extends from the opposite side of the hub 8 and is similarly flared at 12. The flared end 12 of the arm 11 is bi-forked so as to form a V-shaped grasping edge 13.

It is apparent from the above description that the weed pick arm 10 is used for cutting the larger weeds and for picking the same while the weed puller arm 11 is used for both the cutting of the small and larger weeds and is especially constructed so that the V-shaped grasping edge 13 can surround the stem of smaller weeds such as dandelions and the like. The weed puller may be used either for cutting the weed close to the ground or the V-shaped edge 13 may be advanced so that the weed is grasped in the corner thereof as shown in Figure 1. After the weed is firmly held in the V-shaped edge 13 the handle is turned so that the arm 11 is brought to rest upon the ground then it is turned further gradually so that the hub 8 and the other arm 10 engages the ground thereby providing the leverage to readily and easily pull the weed caught in the weed puller 13, out of the ground.

Having thus described my invention what I claim as novel and desire to secure by Letters Patent is:

A weeding pick comprising a pick element of uniform width substantially throughout the length thereof, the end flaring outwardly to a broad cutting edge, and having a V notch formed therein, the top edges of said V notch being chamfered, said elements being curvilinearly formed and uniformly increasing in thickness from the cutting edge to the point of coincidence, continuing into an intermediately formed integral tang adapted to be secured in a tang aperture.

In testimony whereof I affix my signature.

HENRY BREEN.